United States Patent [19]

Duttweiler et al.

[11] Patent Number: 4,491,701
[45] Date of Patent: Jan. 1, 1985

[54] ADAPTIVE FILTER INCLUDING A FAR END ENERGY DISCRIMINATOR

[75] Inventors: Donald L. Duttweiler, Rumson; Timothy J. Zebo, Marlboro, both of N.J.

[73] Assignee: AT&T Bell Laboratories, Murray Hill, N.J.

[21] Appl. No.: 240,977

[22] Filed: Mar. 5, 1981

[51] Int. Cl.³ .............................................. H04B 3/20
[52] U.S. Cl. ................................. 179/170.2; 381/101
[58] Field of Search ........... 179/1 MN, 84 VF, 170.2, 179/170.6, 170.8, 1 D, 175.31 E; 324/77 R, 77 B; 364/724; 333/18

[56] References Cited

U.S. PATENT DOCUMENTS

| 3,499,999 | 3/1970 | Sondhi | 179/170.2 |
| 3,500,000 | 3/1970 | Kelly et al. | 179/170.2 |
| 3,927,260 | 12/1975 | Amundson et al. | 179/1 MN |
| 4,028,496 | 6/1977 | LaMarche et al. | 179/15 A |
| 4,028,506 | 6/1977 | Araseki et al. | 179/170.2 |
| 4,072,830 | 2/1978 | Gitlin et al. | 179/170.2 |
| 4,129,753 | 12/1978 | Duttweiler | 179/170.2 |

OTHER PUBLICATIONS

D. Duttweiler, IEEE Spectrum, "Bell's Echo-Killer Chip", Oct. 1980, pp. 34–37.
J. Otterman, IRE Transactions on Automatic Control, "The Properties and Methods for Computation of Exponentially-Mapped-Past Statistical Variables", Jan. 1960, pp. 11–17.

Primary Examiner—G. Z. Rubinson
Assistant Examiner—Randall P. Myers
Attorney, Agent, or Firm—Thomas Stafford

[57] ABSTRACT

An energy discriminator is employed in conjunction with an adaptive filter to control updating of the filter transfer function characteristic. Specifically, the discriminator is employed to distinguish whether any significant received far end energy is only partial band or whole band. If the received energy is partial band the adaptive filter is inhibited from updating the transfer function characteristic during intervals that such energy is being received. On the other hand, if the received energy is determined not to be partial band and, hence, is whole band, the filter is enabled to update the transfer function characteristic during intervals that such energy is being received.

In a specific example, the discriminator is employed in an adaptive echo canceler to inhibit updating an echo path estimate being generated by an adaptive transversal filter when partial band energy is being received and enabling updating of the echo path estimate when whole band energy is being received.

15 Claims, 4 Drawing Figures

ADAPTIVE FILTER INCLUDING A FAR END ENERGY DISCRIMINATOR

RELATED APPLICATIONS

Copending applications Ser. No. 240,979 and Ser. No. 240,978 were filed concurrently herewith.

TECHNICAL FIELD

This invention relates to adaptive filters and, more particularly, to controlling updating of the filter characteristic during reception of prescribed signals.

BACKGROUND OF THE INVENTION

Adaptive filters operate on a signal supplied thereto in accordance with prescribed criterion to generate a desired output signal. Typically, the filters are operative to generate a transfer function (an inpulse response characteristic) in accordance with an algorithm which includes updating of the transfer function characteristic in response to an error signal. In this way the filter characteristic is optimized to yield the desired result. We have determined, however, that the adaptive filters tend to diverge from the optimum filter characteristic when the supplied signal includes a prescribed class of energy. Specifically, during intervals that the supplied signal includes energy occupying only a portion of a frequency band of interest, for example, a signal frequency tone, multi-frequency tone or the like (hereinafter designated partial band energy) the transfer function characteristic diverges resulting in an undesirable condition of the filter. In digital adaptive filters, the transfer function (impulse pulse response) characteristic is indeterminate when partial band energy is received and the register storing a representation of the impulse response characteristic tends to overflow causing the filter to reset and start the adaptive process over again. This condition is undesirable and should be avoided.

In an echo canceler an adaptive filter is used to generate an echo path estimate which is updated in response to an error signal. Echos commonly occur because of imperfect coupling of incoming signals at 4-to-2wire junctions in communications systems. The echos typically result because of imperfect impedance matching to the 2-wire facility in the 4-to-2 wire junction causing the incoming signal to be partially reflected over an outgoing path to the source of incoming signals.

Self-adapting echo cancelers have been employed to mitigate the echoes by adjusting the transfer function (impulse response) characteristic of an adaptive filter to generate an estimate of the reflected signal or echo and, then, subtract if from the outgoing signal. The filter impulse response characteristic and, hence, the echo estimate is updated in response to the outgoing signal for more closely approximating the echo to be cancelled. Heretofore, the updating of the echo estimate has been inhibited when near end speech signals are being transmitted or when no significant far end energy is being received. However, the echo estimate was allowed to be updated when any significant far end energy was being received, whether it was speech, noise, single frequency tones, multifrequency tones or the like.

We have determined that allowing the canceler to update the echo estimate during intervals that the received far end signal includes partial energy results in an undesirable condition of the communications circuit including the canceler. Specifically, the canceler includes a self-adapting processor, i.e., adaptive filter, which can adjust to a large number of inpulse response characteristics in order to generate the echo path estimate which best approximates the echo. A problem, in addition to that of divergence, with allowing the processor to adjust the transfer function when partial band energy is being received is that although the impulse response characteristic arrived at is optimized for the frequency components of the partial band energy it may not be optimum for the remaining frequency components in the frequency band of interest, for example, the voice band. Indeed, the impulse response adjusted to at frequencies other than those in the partial band energy may be significantly different from the desired optimum adjustment which would be obtained when adjusting on a whole band signal, i.e., speech or Gaussian noise. Consequently, a so-called low return loss path is established in the communications circuit at frequencies other than those in the partial band energy. This low return loss can lead to oscillations in the communications circuit. These oscillations are extremely undesirable and must be avoided.

SUMMARY OF THE INVENTION

The problems of divergence of the filter transfer function characteristic and low return loss in the echo canceler, and other problems associated with adaptive filter arrangements resulting from allowing the filter transfer function characteristic to be adjusted during intervals that partial band far end energy is being received or inputted are overcome in accordance with an aspect of the invention by inhibiting adjustment of the filter characteristic when partial band energy is being received or inputted. Alternatively, the received energy is discriminated as being partial band or whole band and the filter is enabled to adjust the transfer function characteristic only when whole band energy is being received. That is to say, the filter is enabled to adjust the transfer function characteristic during intervals that significant far end energy is being received and the energy is determined not to be partial band and, therefore, is defined as being whole band.

BRIEF DESCRIPTION OF THE DRAWING

The invention will be more fully understood from the following detailed description of an illustrative embodiment taken in connection with the appended figures in which.

DETAILED DESCRIPTION

Figure 1:
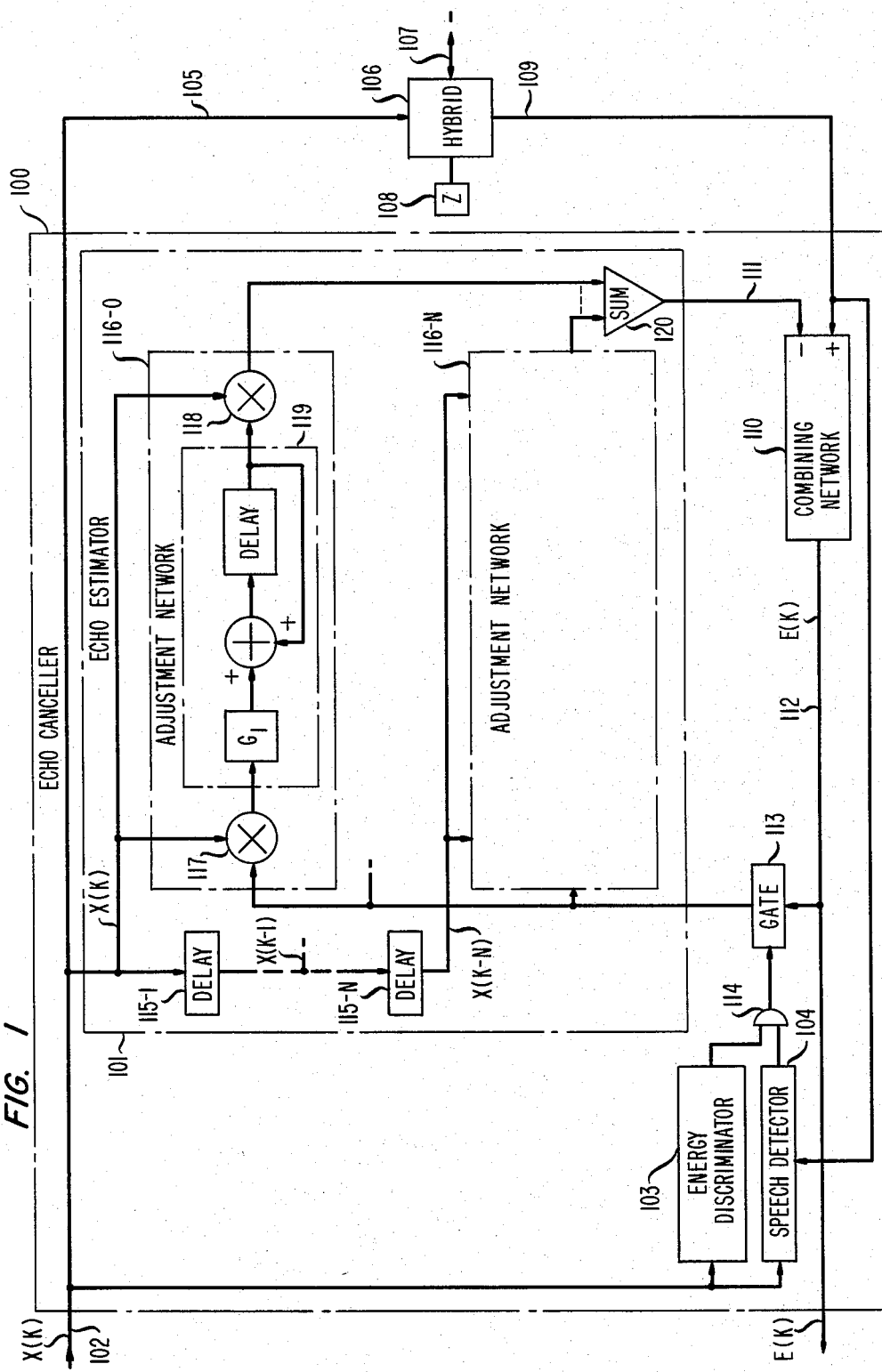
FIG. 1 shows in simplified block diagram form an echo canceler including an embodiment of the invention.

Echo canceler 100 including an embodiment of the invention is shown in simplified block diagram form in FIG. 1. Echo canceler 100 is broadly similar to echo cancelers disclosed in U.S. Pat. Nos. 3,499,999 and 3,500,000. Also see an article entitled "Bell's Echo-Killer Chip", *IEEE Spectrum*, October, 1980, pages 34–37. However, unlike prior echo canceler arrangements, canceler 100 includes energy discriminator 103 for disabling updating of an adaptive filter which generates an echo signal estimate, i.e., a reference signal estimate, in accordance with an aspect of the invention, when a far end signal received over a first transmission path includes a certain class of signals including only so-called partial band energy. Stated another way, the adaptive filter and, hence, the echo signal estimate is enabled to be updated only when the far end signal includes significant whole band energy. Broadly, in one embodiment of the invention first and second prescribed characteristics of received signal X(K), e.g., the maximum and minimum amplitudes of frequency components in a frequency band of interest are compared to determine whether the far end signal is partial band energy. If so, the updating or adapting of the adaptive filter transfer function characteristic and, hence, the echo signal estimate is inhibited. This inhibits the echo canceler adaptive filter from adapting to a transfer function for the partial band signal which would result in possible low return loss for other frequency components in the frequency band of interest e.g., the voice frequency band. Consequently, unwanted oscillations and other problems in the transmission network are avoided.

Briefly, canceler 100 includes an adjustable signal processor, i.e., adaptive filter having a closed loop error control system which is self-adapting in that it automatically tracks signal variation in an outgoing path. More specifically, canceler 100 employs echo estimator 101 including an adaptive transversal filter arrangement for syntehsizing a linear approximation of the echo, or reference signal i.e., an echo estimate.

To this end, far end incoming signal X(K) is usually supplied from a far end talking party over a first transmission path, e.g., lead 102, to a first input of echo canceler 100 and therein to an input of echo estimator 101, an input of energy discriminator 103 and a first input of speech detector 104. Far end signal X(K) may be, for example, a digitally sampled speech signal, where K is an integer identifying the sampling interval. Far end signal X(K) is also supplied via lead 105, perhaps through some conversion circuitry, e.g., a digital-to-analog converter not shown, to a first input of hybrid 106. It is usually desirable for the input signal to hybrid 106 from lead 105 to be supplied over bidirectional path 107 to a near listening party. However, because of an impedance mismatch in hybrid 106, typically caused by balance impedance 108 not exactly matching the impedance of bidirectional path 107 a portion of the hybrid input signal appears on outgoing lead 109 and is reflected to the far end signal source as an echo. The echo is supplied from an output of hybrid 106 over lead 109 to a second input of canceler 100 and therein to a second input of speech detector 104, and a first input of combining network 110. Lead 109 may also include conversion apparatus, e.g., an analog-to-digital converter not shown. A second input to combining network 100 is a signal estimate of the echo generated by echo estimator 101. The echo estimate is supplied via lead 111 from an output of echo estimator 101 to the second input of combining network 110. Combining network 110 generates error signal E(K) corresponding to the algebraic difference between the echo estimate and the output from hybrid 109 including the undesirable echo. Error signal E(K) is supplied over a second transmission path, e.g., lead 112 to the far end source and to controllable switching gate 113. Gate 113 is controlled to be enabled or inhibited by an output signal from AND gate 114. A first state of the output from AND gate, e.g., a logical 1 enables gate 114 to supply error signal E(K) to estimator 101 while a second state of the output from AND gate 114, e.g., a logical 0 inhibits gate 114 from supplying error signal E(K) to estimator 111.

Heretofore, gate 113 was controlled to inhibit supplying error signal E(K) to estimate 101 when significant far end energy was not present, when near end speech was pesent or when a prescribed relationship between error signal E(K), far end signal X(K) and a status signal indicates the presence of near end speech signals as described in U.S. Pat. No. 4,129,753. As indicated above far end signal X(K) could include speech, noise, any of a number of individual tones, multifrequency tones or the like. Thus, in prior arrangements error signal E(K) was only inhibited when no significant far end energy was detected or when near end speech was detected. On the other hand, error signal E(K) was supplied to estimator 101 during intervals that significant far end energy in signal X(K) was detected. This energy could be partial band energy, i.e., a single frequency tone multifrequency tones or the like. Consequently, estimator 101 was allowed to adapt or otherwise be adjusted during the intervals that only partial band energy was being received. As indicated above such an adjustment results in undesirable results. Specifically, the transfer function characteristic to which estimator 101 may adjust to for the frequency components of the partial band signal would possibly result in a low return loss for other frequency components in the frequency band of interest. This, in turn, may cause unwanted oscillations in the communications circuit. The undesirable oscillations and other problems arise from allowing estimator 101 to be adjusted when partial band energy is present are avoided, in accordance with an aspect of the invention, by employing energy discriminator 103 to distinguish whether far end signal X(K) includes only partial band energy or whole band energy. If it is determined that X(K) is not whole band energy, e.g., speech or noise, or stated another way, if X(K) is partial band energy, e.g., a single frequency tone, multifrequency tones or the like, discriminator 103 generates an output which inhibits AND gate 114. AND gate 114, in turn, generates a control signal to inhibit gate 113 from supplying E(K) to estimator 101. Specifically, a first state of the control signal from gate 114, e.g., a logical 1 enables gate 113 while a second state of the conrol signal, e.g., a logical 0 inhibits gate 113. Consequently, the impulse response characteristic and, hence, the echo estimate generated by estimator 101 remains constant during intervals that partial band energy is present and an undesirable adjustment is avoided.

Estimator 101 includes a so-called tapped delay line comprised of delay units 115-1 through 115-N for realizing desired delays at the taps corresponding to convenient Nyquist intervals. Therefore, delayed replicas X(K-1) through X(K-N9 of incoming far end signal X(K) are generated at the corresponding taps. The signal at each tap position, namely X(K-1) through X(K-N) as well as X(K), is adjusted in response to error signal E(K). More particularly, signals X(K) through X(K-N) are individually weighted in response to E(K) via a corresponding one of adjustment networks 116-0 through 116-N, respectively. Adjustment networks 116-0 through 116-N each include multipliers 117 and 118, and feedback loop 119. Feedback loop 119 adjusts the tap weight to a desired value in a manner which will be apparent to those skilled in the art and explained in the above-noted references. The weighted replicas of X(K) from adjustment networks 116-0 through 116-N are summed via summing network 120 to generate the echo estimate signal approximating the echo to be cancelled. The echo estimate is supplied via lead 111 to the second input of combining network 110.

Figure 2:
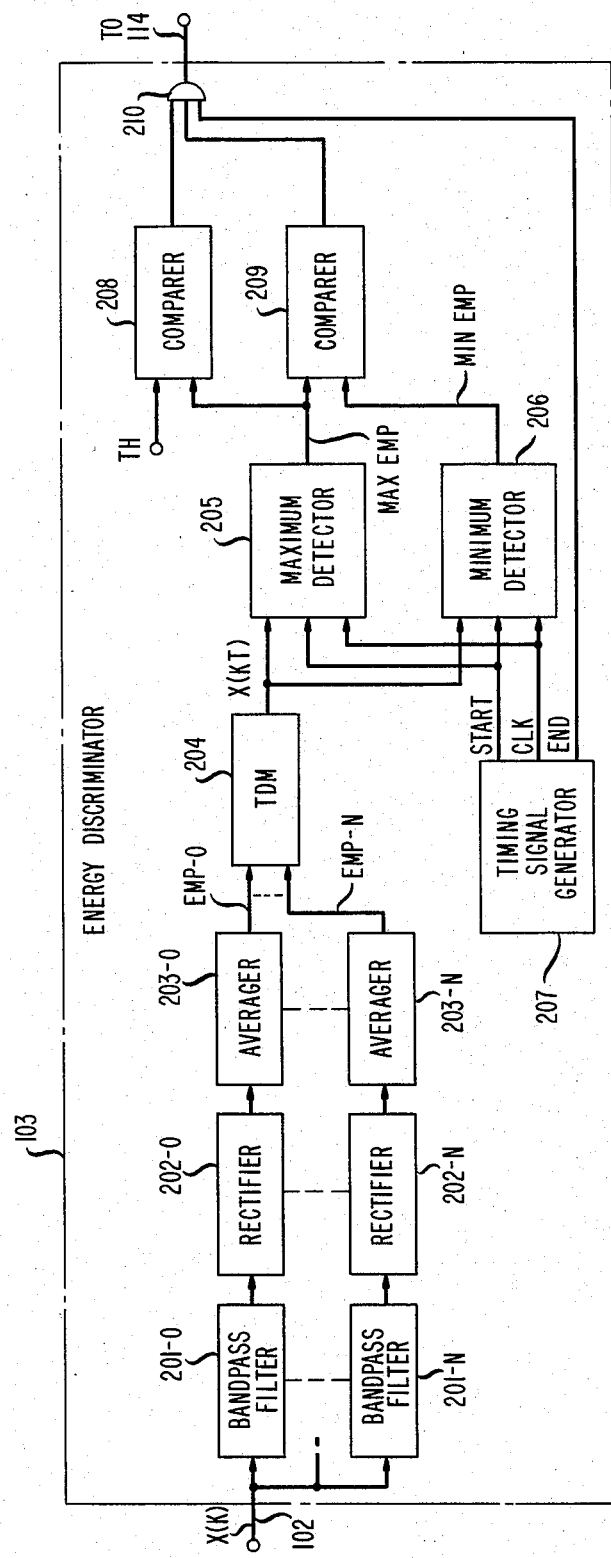
FIG. 2 depicts in simplified form details of the energy discriminator employed in FIG. 1.

FIG. 2 shows in simplified block diagram form one embodiment of energy discriminator 103 which may be utilized, in accordance with an aspect of the invention, to determine whether energy in received signal X(K) is only partial band or whole band. In this example not to be construed as limiting the scope of the invention, the frequency band of interest is the telephone voice frequency band of approximately 300 Hz to 4000 Hz. Whole band energy is, for example, speech, Gausian noise or the like, i.e., signals having frequency components across the whole frequency band. Partial band energy is, for example, single frequency tones, multifrequency tones or the like, i.e., signals having frequency components in relatively narrow frequency portions of the frequency band of interest.

Accordingly, received signal X(K) is supplied to bandpass filters 201-0 through 201-N to obtain signals representative of frequency components therein. If X(K) is a digital signal, for example, representative of a $\mu$-law sample, a $\mu$-law to linear digital converter, not shown, would be used prior to filters 201-0 through 201-N. In this example, the filters should be capable of covering the voice frequency band of interest. In a specific example, the number of filters employed is 16, i.e., N=15 and, preferably, they are of a digital type described, for example, in *Digital Processing of Signals*, Bernard Gold and Charles M. Rader, McGraw-Hill Book Co., N.Y. 1969, beginning at page 84. Indeed, it is contemplated that the digital bandpass filters will be realized by employing fast Fourier transform (FFT) techniques. Outputs from filters 201-0 through 201-N are supplied to rectifiers 202-0 through 202-N, respectively. In a digital system, the rectification is achieved by dropping the sign bit associated with the encoded amplitude sample. Rectified outputs from rectifiers 202-0 through 202-N are supplied to averagers 203-0 through 203-N, respectively. Each of averagers 203 generate a short term running average of the signal samples supplied thereto. Thus, each of the averagers 203 provide a running measure of the corresponding rectified filtered component of X(K) and may be thought of as a low pass filter having a predetermined time constant, illustratively on the order of 256 milliseconds. A variety of arrangements and techniques may be employed for generating the running average magnitude of the signal samples. One technique is to obtain the exponentially mapped past (EMP) of the signal samples. EMP averaging is particularly useful in control or detection situations where interest is directed at the recent past behavior of a process and is described in *IRE Transactions on Automatic Control*, Vol. AC-5, January 1960, pages 11-17. The EMP average of a sequence of samples is determined by weighting recent samples more heavily than less recent samples, the relative weighting being for example a geometric ratio. An example of a digital averaging circuit employing EMP is described in U.S. Pat. No. 4,028,496.

Figure 4:
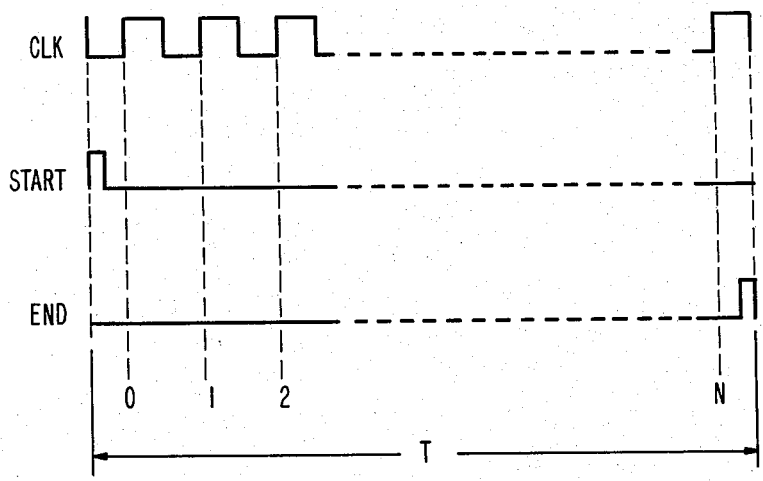
FIG. 4 is a sequence of timing signals useful in describing operation of the discriminator of FIG. 2 and maximum detector of FIG. 3.

EMP-O thrugh EMP-N are time division multiplexed, in well known fashion, via multiplexer (TDM) 204 to form serial signal X(KT). In this example, X(KT) includes a serial sequence of digital representations of EMP-O through EMP-N. In turn, X(KT) is supplied to maximum detector 205 and minimum detector 206 wherein the maximum (MAX) and minimum (MIN), respectively, EMP samples are detected. Timing signals START and CLK, as shown in FIG. 4 for operating detectors 205 and 206 are generated by timing signal generator 207 in well known fashion. A signal representative of the MAX EMP sample, i.e., a first value of a prescribed characteristic of the input sample X(K), is supplied to first inputs of comparers 208 and 209 while a signal representative of the MIN EMP sample, i.e., a second value of the prescribed characteristic of the input sample X(K), is supplied to a second input of comparer 209. A signal representative of a predetermined threshold (TH), is supplied to a second input of comparer 208. Threshold TH is a predetermined value selected to indicate the presence of significant far end energy. In this example TH= —35 dBmO. Comparer 208 generates a first state output representative of a logical 1 when MAX EMP is greater than TH. This indicates that significant far end energy is being received. An output from comparer 208 is supplied to a first input of AND gate 210. Comparer 209 is employed to determine when MAX EMP and MIN EMP are in a prescribed relationship and, hence, partial band energy is being received. In one example not to be construed as limiting the invention, it is assumed that if the ratio of the MAX EMP to MIN EMP is greater than ten (10), the energy in signal X(K) is partial band as compared to whole band. This follows since for partial band energy frequency components are in one or more limited narrow frequency band portions of the frequency band of interest and the ratio of MAX EMP to MIN EMP is large. On the other hand, when whole band energy is being received there are frequency components across the whole frequency band and the ratio of MAX EMP to MIN EMP is small. Thus, when MAX EMP is greater than 10 MIN EMP comparer 209 generates a low state signal. An output from comparer 209 is supplied to a second input of AND gate 210. Consequently, when comparer 209 generates a low state signal AND gate 210 is inhibited and its output is a low state signal. When MAX EMP is less than 10 MIN EMP comparer 209 generates a high state signal. Thus, when MAX EMP exceeds TH and is less than 10 MIN EMP, AND gate 210 is enabled to generate a high state signal when interrogated by END. AND gate 210 is interrogated at periodic intervals by signal END supplied from timing signal generator 207. As shown in FIG. 4, signal END is generated and AND gate 210 is interrogated at the end of each period T including N+1 samples from multiplexer 204. In this example, T=125 $\mu$-sec and N=15.

Figure 3:
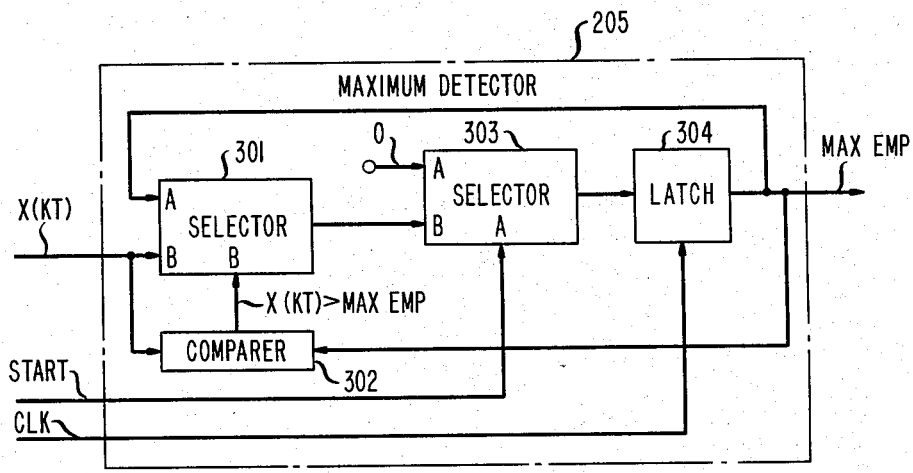
FIG. 3 shows details of the maximum detector employed in the discriminator of FIG. 2.

FIG. 3 shows in block diagram from details of one arrangement which may be employed for maximum detector 205. A similar approximately modified arrangement may be employed for minimum detector 206 as will be apparent to those skilled in the art. Accordingly, the time division multiplexed EMP samples X(KT) are supplied to a first input of selector 301, namely input B, and to a first input of comparer 302. Output MAX EMP from detector 205 and, hence, latch 304 is supplied to a second input of selector 301, namely input A, and to a second input of comparer 203. Comparer 302 generates a high state output when the presently supplied signal sample of X(KT) is greater than MAX EMP. The output from comparer 302 is supplied to B select input of selector 301. Thus, selector 301 operates normally to supply the signal sample on input A to input B of selector 303 except when a high state signal from comparer 302 enables it to supply the signal sample on input B to selector 303. Selector 303 is employed to initialize detector 205. To this end, a signal sample representative of zero (0) is supplied to input A while the output from selector 301 is supplied to input B. Selector 303 normally supplies the signal sample on input B to latch 304. Selector 303 is enabled via signal START to supply a zero output at the beginning of each period T as shown in FIG. 4. Then detector 205 operates to compare the signal samples of X(KT) to determine the MAX EMP sample. The MAX EMP sample is stored in latch 304 which is updated for each sample of X(KT) via signal CLK, as shown in FIG. 4. Operation is straightforward, if the current MAX EMP sample in latch 304 is greater than the sample of X(KT), the MAX sample is again stored and compared to the next subsequent sample X(KT). If the presently supplied sample of X(KT) is greater than the presently stored MAX EMP sample, the presently suppied sample of X(KT) becomes the new stored MAX EMP sample. This process is repeated for each sample of X(KT) and at the end of period T the MAX EMP is the output from detector 205.

What is claimed is:

1. A adaptive filter of the type comprising, signal processing means adapted to be supplied with an input signal and being responsive to an error signal for generating an estimate of a reference signal by adjusting a transfer function characteristic, means responsive to a control signal for inhibiting adjusting of said transfer function characteristic, and means for algebraically combining said reference signal estimate with a reference signal developed in response to said input signal to generate said error signal, the adaptive filter, characterized by, means responsive to the input signal for detecting partial band energy and for generating said control signal to inhibit adjusting of said transfer function characteristic during intervals that partial band energy is detected in the input signal.

2. An adaptive filter of the type comprising, signal processing means adapted to be supplied with an input signal and being responsive to an error signal for generating an estimate of a reference signal by adjusting a transfer function characteristic, means responsive to a control signal for enabling adjusting of said transfer function characteristic, and means for algebraically combining said reference signal estimate with a reference signal developed in response to said input signal to generate said error signal, the adaptive filter, characterized by, means responsive to the input signal for detecting whole band energy and for generating said control signal to enable adjusting of said transfer function characteristic during intervals that whole band energy is detected in the input signal.

3. An adaptive filter of the type comprising, signal processing means adapted to be supplied with an input signal and being responsive to an error signal for generating an estimate of a reference signal by adjusting a transfer function characteristic, means responsive to a control signal for controlling adjusting of said transfer function characteristic, and means for algebraically combining said reference signal estimate with a reference signal developed in response to said input signal to generate said error signal, the adaptive filter, characterized by, means for discriminating between whole band energy and partial band energy in the input signal and for generating a first state of said control signal to inhibit adjusting of said transfer function characteristic during intervals that partial band energy is detected in the input signal and a second state of said control signal to enable adjusting of said transfer function characteristic during intervals that partial band energy is detected in the input signal.

4. An echo canceler of the type including, adjustable signal processing means adapted to be coupled to a first transmission path and being supplied with an input signal for generating a transfer function characteristic to generate an echo estimate signal, means adapted to be coupled to a second transmission path for combining an echo signal developed in the second path in response to said input signal with the echo estimate signal to generate an error signal, means responsive to the error signal for adjusting the processing means to update the transfer function characteristic, and means responsive to a control signal for controllably supplying the error signal to the adjusting means to control updating of the transfer function characteristic, the echo canceler, characterized by, means for detecting partial bend energy in said input signal in the first transmission path and for generating said control signal to inhibit the controllable supplying means from supplying the error signal to the adjusting means during intervals that partial band energy is detected in the input signal for inhibiting updating of the transfer function characteristic.

5. An echo canceler of the type including, adjustable signal processing means adapted to be coupled to a first transmission path and being supplied with an input signal for generating a transfer function characteristic to generate an echo estimate signal, means coupled to a second transmission path for combining an echo signal developed in the second path in response to said input signal with the echo estimate signal to generate an error signal, means responsive to the error signal for adjusting the processing means to update the transfer function characteristic, and means responsive to a control signal for controllably supplying the error signal to the adjusting means to control the updating of the transfer function characteristic, the echo canceler, characterized by, means for detecting whole band energy in said input signal in the first transmission path and for generating said control signal to enable the controllable supplying means to supply the error signal to the adjusting means during intervals that whole band energy is detected in the input signal for enabling updating of the transfer function characteristic.

6. An echo canceler of the type including, adjustable signal processing means adapted to be coupled to a first transmission path and being supplied with an input signal for generating a transfer function characteristic to generate an echo estimate signal, means adapted to be coupled to a second transmission path for combining an echo signal developed in the second path in response to said input signal with the echo estimate signal to generate an error signal, means responsive to the error signal for adjusting the processing means to update the transfer function characteristic, and means responsive to a control signal for controllably supplying the error signal to the adjusting means to control updating of the transfer functon characteristic, the echo canceler, characterized by, means for discriminating between whole band energy and partial band energy in said input signal in the first transmission path and for generating a first state of said control signal to inhibit the controllable supplying means from supplying the error signal to the adjusting means during intervals that partial band energy is detected in the input signal for inhibiting the updating and a second state of said control signal to enable the controllable supplying means to supply the error signal to the adjusting means during intervals that whole band energy is detected in the input signal for enabling the updating.

7. The invention as defined in claims 1 or 4 wherein said detecting means includes means for comparing a first value of a prescribed characteristic of the input signal to a second value of said prescribed characteristic of the input signal, said comparing means generating said control signal for inhibiting the adjusting when a predetermined relationship exists between said first and second values of said prescribed characteristic.

8. The invention as defined in claim 7 wherein said first and second values of said prescribed characteristic are maximum and minimum magnitudes, respectively, of frequency components in the input signal.

9. The invention as defined in claims 1, 2, 4 or 5 wherein said detecting means includes means for generating signals representative of frequency components of the input signal, and means for comparing prescribed magnitudes of said frequency component signals to detect said energy in the input signal.

10. An echo canceler as defined in claim 9 wherein said detecting means further includes means for obtaining average magnitude values of each of said frequency component signals, means for detecting the maximum one of said average magnitude values, and means for detecting the minimum one of said average magnitude values, said maximum and minimum magnitude values being supplied to said comparing means.

11. The invention as defined in claim 10 wherein said averaging means includes low pass filter means for obtaining the exponentially mapped past average.

12. The invention as defined in claims 1 or 4 wherein said detecting means includes, means for generating signals representative of frequency components of the input signal, means for obtaining average magnitude values of each of said frequency component signals, means for detecting the maximum one of said average magnitude values, means for detecting the minimum one of said average magnitude values, and comparing means supplied with said maximum average magnitude value and said minimum average magnitude value for generating a first state of said control signal for inhibiting the updating when a ratio of said maximum average magnitude value to said minimum average magnitude value is equal to or greater than a predetermined value.

13. The invention as defined in claims 2 or 5 wherein said detecting means includes, means for generating signals representative of frequency components of the input signal, means for obtaining average magnitude values of each of said frequency component signals, means for detecting the maximum one of said average magnitude values, means for detecting the minimum one of said average magnitude values, and comparing means supplied with said maximum average magnitude value and said minimum average magnitude value for generating a second state of said control signal for enabling the updating when a ratio of said maximum average magnitude value to said minimum average value is less than a predetermined value.

14. The invention as defined in claims 3 or 6 wherein said discriminator means includes a plurality of bandpass filters each having a predetermined passband for generating a plurality of signals representative of frequency components in the input signal.

a plurality of averaging means associated on a one-to-one basis with said plurality of bandpass filters for obtaining exponentially mapped past average magnitude values of said frequency component signals, means for detecting the maximum average magnitude value, means for detecting the minimum average magnitude value, and means for comparing said maximum and minimum average magnitude values to determine whether said received signal includes only partial band energy or whole band energy, said comparing means generating said first state of said control signal during intervals that partial band energy is detected and said second state of said control signal during intervals that whole band energy is detected.

15. The invention as defined in claim 14 wherein said discriminator means further includes means for multiplexing said signals representative of said average magnitude values into a serial signal stream, wherein said maximum detecting means includes means for comparing successive ones of the average magnitude value signals in said signal stream to determine the maximum average magnitude value, said minimum detector means includes means for comparing successive one of the average magnitude value signals to determine the minimum average magnitude value, and said comparing means generates said first state of said control signal during intervals that a ratio of said maximum average magnitude value to said minimum average magnitude value is equal to or greater than a predetermined value and said second state of said control signal during intervals that said ratio is less than said predetermined value.

* * * * *